Oct. 22, 1940.    R. W. JOHNSON    2,219,104
CONTROL DEVICE FOR OIL BURNERS
Filed Feb. 18, 1937    4 Sheets-Sheet 1

INVENTOR
ROY W. JOHNSON
BY
John W. Michael
ATTORNEY

Oct. 22, 1940.   R. W. JOHNSON   2,219,104
CONTROL DEVICE FOR OIL BURNERS
Filed Feb. 18, 1937   4 Sheets-Sheet 2

INVENTOR
ROY W. JOHNSON
BY
John W. Michael
ATTORNEY

Oct. 22, 1940.                R. W. JOHNSON                 2,219,104
                        CONTROL DEVICE FOR OIL BURNERS
                    Filed Feb. 18, 1937         4 Sheets-Sheet 3

INVENTOR
ROY W. JOHNSON
BY
John W. Michael
ATTORNEY

Oct. 22, 1940.    R. W. JOHNSON    2,219,104
CONTROL DEVICE FOR OIL BURNERS
Filed Feb. 18, 1937    4 Sheets-Sheet 4

INVENTOR
ROY W. JOHNSON
BY
John W. Michael
ATTORNEY

Patented Oct. 22, 1940

2,219,104

UNITED STATES PATENT OFFICE 2,219,104

CONTROL DEVICE FOR OIL BURNERS

Roy W. Johnson, Milwaukee, Wis.

Application February 18, 1937, Serial No. 126,349

2 Claims. (Cl. 236—1)

This invention relates to an improvement in control devices for oil burners of the type equipped with a blower and is designed to control the flow of oil to the burner and also regulate the operation of the blower.

One of the objects of the invention is to provide a control device of this character in which the several control instrumentalities are combined in one complete compact unit so as to simplify the cost of manufacture and assure the efficient operation of the burner and its blower as well as quiet and efficient operation of the control device.

Another object of the invention is to improve the construction and operation of the metering valve so as to insure a uniform though controlled flow of the oil in any position of the valve, particularly in the low fire position.

Another object of the invention is to provide a control device of this character in which the metering valve regulating the supply of oil to the burner and the blower for supplying air thereto are ordinarily automatically controlled by a thermo-responsive switch but wherein the control device is equipped with a manually operable service switch which may be manipulated to cause the metering valve to fully open and the blower to operate or the blower alone to operate, all independently of said thermo-responsive switch.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 15:
Figure 10:
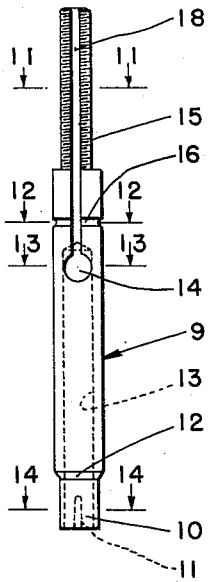
Figure 10 is a detail view in elevation of the metering valve.
Figure 11:
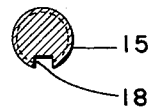
Figure 16:
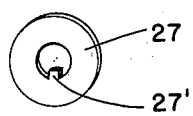
Figure 12:
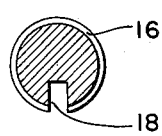
Figure 17:
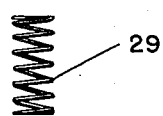
Figure 13:
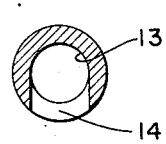
Figure 18:
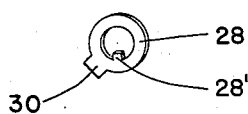
Figure 20:
Figure 14:
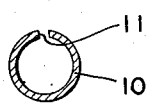
Figure 19:
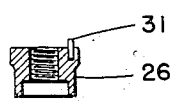
Figure 21:
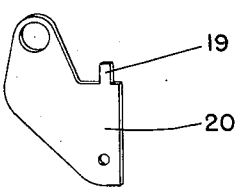

Figures 11, 12, 13 and 14 are cross sectional views taken on lines 11—11, 12—12, 13—13 and 14—14, respectively, of Figure 10;

Figure 15 is a view in transverse vertical cross section showing the high fire nut;

Figure 16 is a perspective view of the washer associated with the high fire nut;

Figure 17 is a view in elevation of the spring interposed between the high fire and low fire nuts;

Figure 18 is a perspective view of the washer associated with the low fire nut;

Figure 19 is a view in transverse vertical cross section of the low fire nut;

Figure 20 is a view in elevation of the retaining ring which limits the upward movement of the metering valve; and Figure 21 is a detail perspective view of the key plate employed for preventing rotation of the metering valve.

Figure 1:
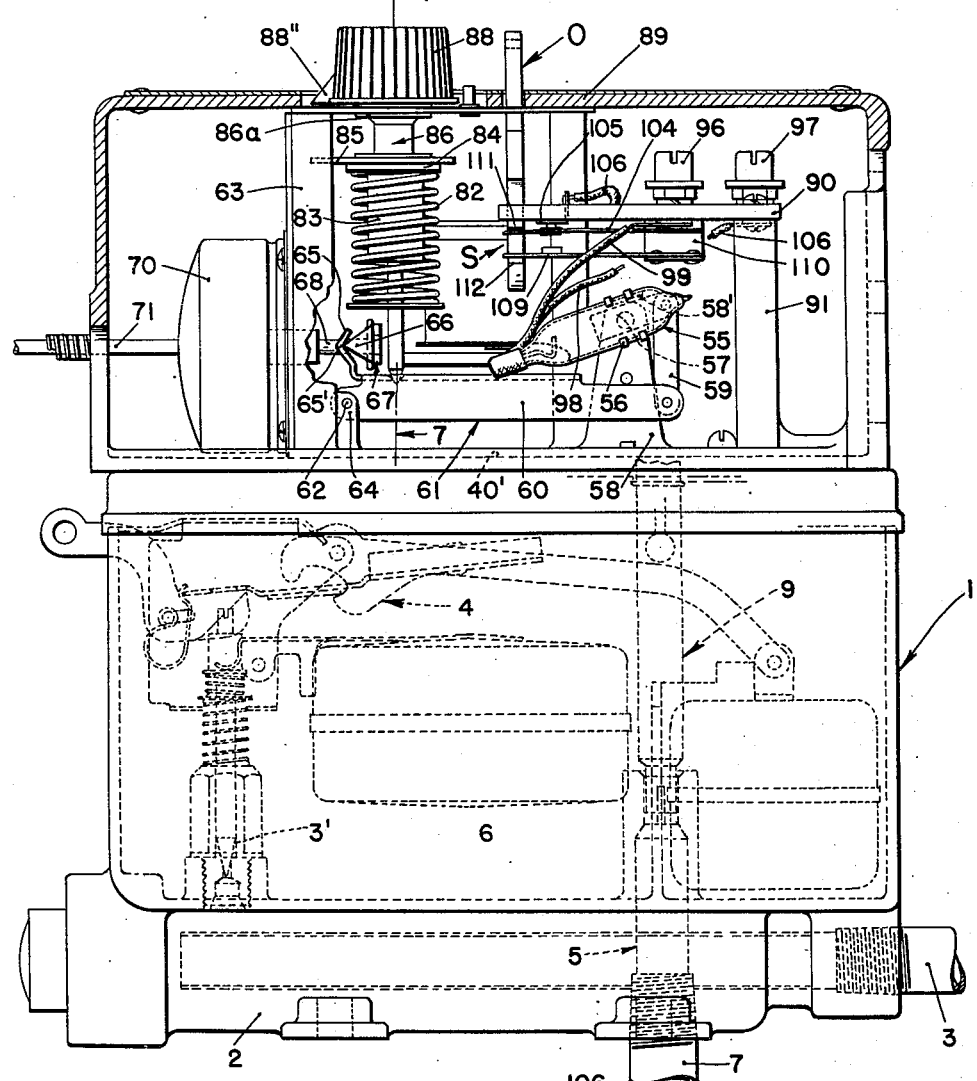
Figure 1 is a view partly in side elevation and partly in longitudinal vertical section showing a control device embodying the present invention.
Figure 2:
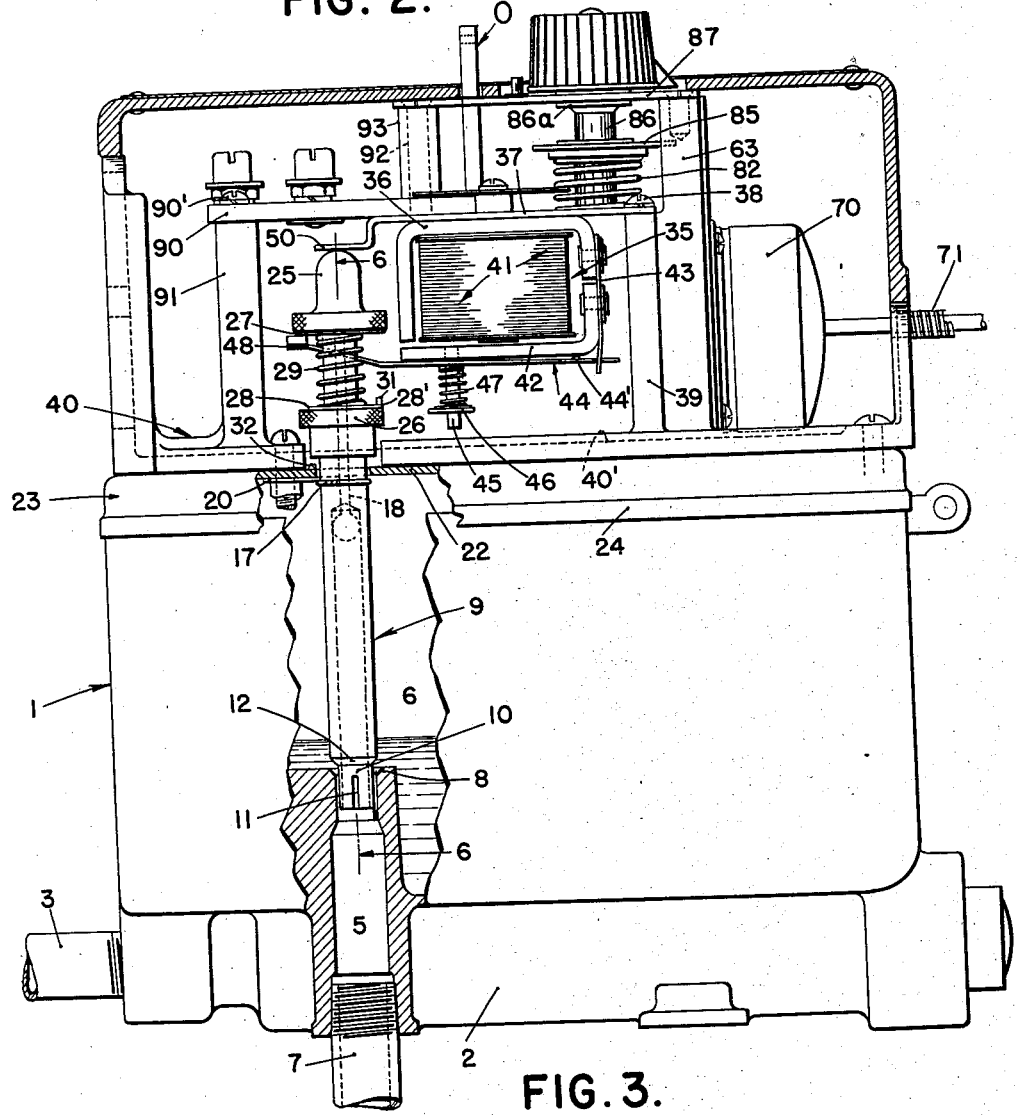
Figure 2 is a similar view taken from the opposite side of the device in Figure 1.

Referring to the drawings, and more particularly to Figures 1 and 2, it will be seen that in the embodiment of the invention there illustrated, a casing 1 is provided and has an inlet 2 formed integral with its bottom to which fuel is supplied from a fuel supply line 3. Within the casing 1 is a float controlled inlet valve 3' equipped with an automatic safety cut-off 4. The float controlled inlet valve 3' maintains a constant level of liquid in the main supply chamber 6 of the casing 1. This structure will not be described in detail as it per se forms no part of the present invention and is fully described and claimed in United States Letters Patent No. 2,068,138, granted to me, January 19, 1937, for Devices for controlling the flow of fuel to oil burners and the like.

An outlet passage 5 is in direct communication with the main supply chamber 6 of the valve case 1 and has a pipe 7 leading therefrom to the burner. The upper end of the outlet passage is provided with a valve seat 8. A tubular metering valve designated generally at 9 regulates the flow of oil from the main supply chamber 6 out through the outlet 5. As shown to advantage in Figures 2, 6 and 10, the lower end of this valve 9 is reduced as at 10 and the reduced portion 10 is provided with a vertically extending metering slot 11. At the juncture of the reduced portion 10 and the main portion of the valve 9 a beveled shoulder 12 is provided and when the valve is fully closed this shoulder seats against the correspondingly formed surface of the valve seat. For the major portion of its extent the valve 9 is hollow or tubular, that is, is provided with an axial bore or passage 13. The upper end of this passage 13 communicates with a transverse passage 14 communicating with the main chamber 6 above the level of the liquid therein so as to vent the valve.

Above the passage 13 the valve is solid and has a reduced and externally threaded stem 15. An annular groove 16 is provided in the solid portion of the valve to receive a split resilient retaining ring 17 which, in the assembly, limits the upward movement of the valve. A longitudinal key-way or slot 18 is provided in the valve above the transverse passage 14 and is designed to receive a key or lug 19 integral with the key plate 20 and functioning to prevent rotation or angular movement of the valve 9. This plate 20 is fastened in any suitable way to the underside of a cross member 22 of a top frame member 23 of open construction but downwardly flanged as at 24 to overlap the upper edge of the casing to which it is releasably secured thereto by metallic screws.

A high fire nut 25 and a lower fire nut 26 are threadably engaged with the reduced stem 15 of the valve. Washers 27 and 28 are slidably mounted on the stem 15 adjacent the high and low fire nuts 25 and 26, respectively. These washers have integral keys 27' and 28' (see Figures 16 and 18) which ride in the key-way 18 to preclude rotation of the washers although allowing the same to slide along the valve stem. A spring 29 is interposed between the washers and is under compression in all positions of the nuts to releasably retain them in adjusted position. The washer 28 may be provided with a radial projection 30 engageable with a pin 31 on the low fire nut 26 to limit the rotation or adjustment of this nut (see Figures 2 and 18).

The reduced portion 10 of the valve is a loose fit in the upper end of the outlet passage so that it may be cocked or canted slightly in the low fire position of the valve. A clearance of the order of four one-thousandths of an inch between the outer periphery of the reduced portion 10 of the valve and the inner wall of the upper end of the outlet passage 11 is satisfactory in many installations. Of course, this clearance may be varied to suit conditions. The cocking or canting of the valve may be effected by providing a narrow fulcrum strip 32 on the cross member 22 of the frame on the same side of the valve 9 as its metering slot 11. In the low fire position of the valve 9 the underface of the low fire nut 26 at one side thereof rests on the fulcrum strip 32. This unbalanced support of the valve in the low fire position thereof causes it to angle over as indicated by the dot and dash lines in Figure 6 and brings its metering slot 11 in snug engagement with adjacent portions of the wall of the outlet passage 5. In this way very uniform control over the oil in the low fire position of the valve is had. It appears that in such an arrangement practically all the flow is through the metering slot 11 and the slot 11 is so related to the wall of the outlet passage that it has very effective control.

An electromagnet designated generally at 35 (see Figure 2) controls the position of the valve 9. The magnet has an inverted, generally U-shaped frame 36 secured by suitable fastening devices to a fixed mounting plate 37 fastened by a screw 38 to a post 39 which is integral with the base plate 40' of a control supporting frame 40 mounted on the top frame 23 and releasably secured in place in any suitable manner. The windings 41 of the magnet and its core are carried by the frame 36. One depending leg of the frame 36 supports the armature 42 of the magnet. The armature 42 is of L-shape and has its short leg flexibly connected to the frame 36 by a flexible spring strap or band 43 which is riveted to both the frame and the armature but is sufficiently flexible or resilient to allow the magnet when energized to pull the armature upwardly. An arm 44 is yieldably connected to the underside of the armature and for this purpose it is provided with an opening through which a pin 45 extends. The upper end of the pin is fastened to the armature and its lower end is designed to engage the base plate 40' so as to act as a stop or limit the downward movement of the armature when the winding 41 is deenergized. Below the spring arm 44 the pin 45 is provided with a cotter key and washer 46. A spring 47 under light compression encircles the pin 45 and has its lower end abutting against the cotter key and washer and its upper end pressing against the underside of the spring arm 44. Spaced from the pin are fulcrum bosses 44' struck up from the spring arm 44 and bearing against the underside of the armature. The band 43 which connects the armature to the frame is extended downwardly below the armature and its lower end portion is formed with a slot through which one end of the arm 44 extends. The opposite end of the arm 44 is curved laterally into hook-form to pass around the stem 15 so that the end 48 may be provided with an inverted V-shaped projection engageable with the underside of the flange of the high fire nut.

With this structure, when the electromagnet is energized the armature 42 is pulled upwardly, the arm 44 is carried with it and in so moving its hooked end 48 acts on the high fire nut 25 to pull the metering valve 9 upwardly to its high fire position. The extent of this movement depends upon the adjustment of the nut 25, which is engageable with a stop 50 conveniently formed as an extension of the supporting bracket 37. In some adjustments the high fire nut 25 engages the stop 50 before the armature 42 has completed its movement and in such event the armature continues to move since the spring 47 is readily compressible to allow the necessary relative movement between the armature and the arm 44.

When the electromagnet winding 41 is deenergized the armature 42 and metering valve 9 drop by gravity until the underface of the low fire nut 26 engages its fulcrum strip 32. The height of the low fire flame is determined within limits by the adjustment of the nut 26 on the threaded stem 18 of the valve. Pin 45 is engageable with base 40' to limit downward movement of armature 42.

Figure 6:
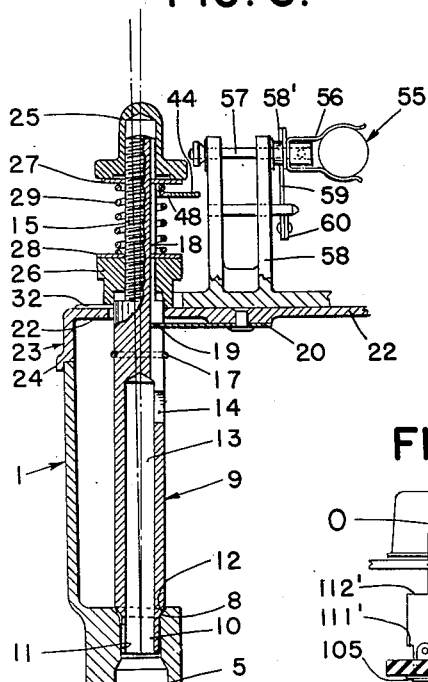
Figure 6 is a fragmentary view taken in transverse vertical section on line 6—6 of Figure 2, parts being shown in elevation for the sake of illustration.
Figure 9:
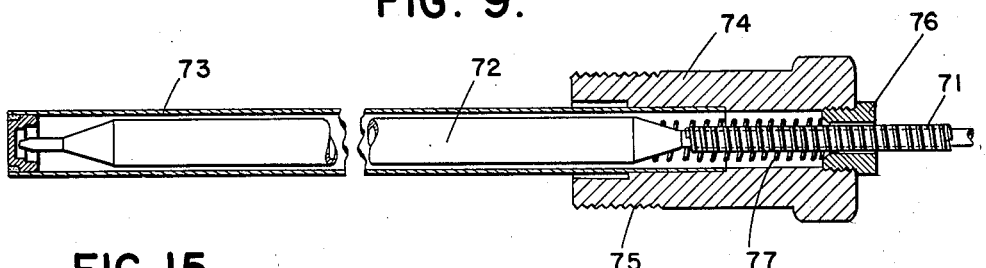
Figure 9 is a view partly in elevation and partly in longitudinal cross section showing the thermo-responsive element removed from the water heater.

The action of the electromagnet 35 is ordinarily controlled by a mercury tube switch 55 which is mounted in a carrier or clamp 56 having a trunnion shaft 57 supporting the carrier and the switch for rocking movement on a bracket 58 secured to and upstanding from the base 40' of the frame 40 (see Figures 1 and 6). A crank arm 58' is fixed to the carrier 56 and has its outer end pivoted to one end of a link 59, the opposite end of the link being pivotally connected to one end of the long arm 60 of an operating lever designated generally at 61. The lever 61 is fulcrumed as at 62 on lugs 64 cast integral with the base 40' and upright members 63 of the control frame. Integral with the arm 60 of the lever 61 is a short upstanding lever arm 65 (see Figure 1) which is bifurcated and provided with V-shaped seats 65' engageable by the pointed end portions 66 of a cross head 67 fixed to the outer end of a rod 68 connected to the movable member or diaphragm (not shown) of a bellows designated generally at 70. The interior of the bellows is hermetically sealed and is filled with a volatile liquid under vacuum. The interior of the bellows is suitably connected to and communicates with one end of an armored tubing 71 which extends to and is in communication with a thermo bulb 72 (see Figure 9). This is contained in an immersion well 73 having a bushing 74 externally threaded as at 75 so as to be adapted for threaded engagement with a suitable fitting provided on the water heater. A nut 76 and spring 77 retains the thermo bulb in proper position in its immersion well.

Figure 7:
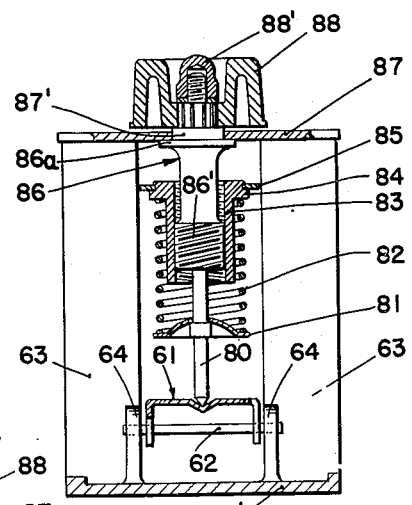
Figure 7 is a similar view taken on line 7—7 of Figure 1.

Temperature adjustment mechanism is combined with the operating lever 61 and comprises a vertical pin 80 (see Figures 1 and 7) having its lower end pointed and bearing in a depression provided therefor in the long arm 60 of the lever 61 to one side of its fulcrum 62. A washer or collar 81 is fixed to the pin 80 and provides an abutment for the lower end of a compression coil spring 82. This spring surrounds the upper portion of the pin 80 and also encircles a bushing 83 having a flange 84 against which the upper end of which the spring 82 bears. Swiveled to the upper portion of the bushing 83 is a guide or key plate 85, one end of which projects in between and has sliding engagement with the uprights 63 to constrain the bushing 84 to vertical right line movement.

Figure 5:
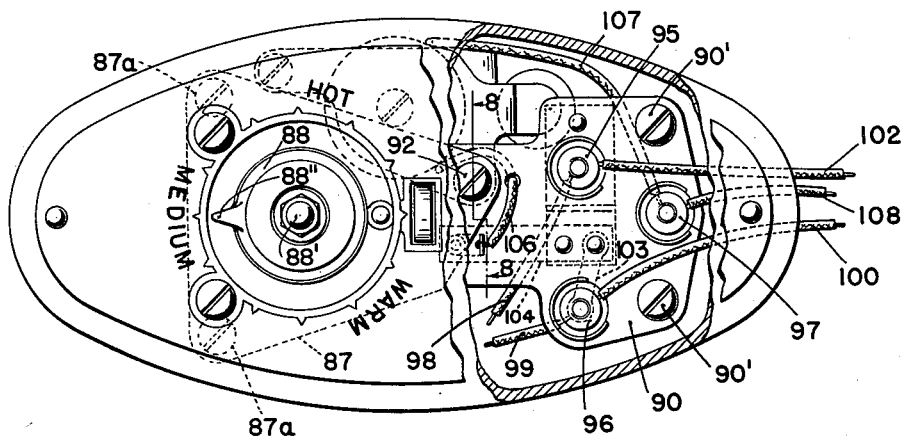
Figure 5 is a plan view of the device, a portion of the control cover being broken away for the sake of illustration.

A short screw shaft designated generally at 86 is provided and has its lower end externally threaded as at 86' and engaged with the internal threads of the bushing 83. Adjacent its upper end the shaft 86 has a portion 87' rotatably interfitted with a bracket plate 87 fastened by screws 87ª (see Figure 5) to the upper ends of the uprights 63. Just below the plate 87 the shaft 86 has an annular shoulder 86ª which, in the assembly, is pressed up against the underside of the plate 87 by the spring 82. The shaft 86 projects above the bracket plate 87 and its upper portion is keyed to the hub of an operating knob 88. A nut 88' holds the knob 88 against displacement off the upper end of the shaft 86. A cover 89 is provided for the several control instrumentalities and is releasably secured in position. In its top portion the cover 89 is provided with an opening to accommodate the knob 88 which projects upwardly beyond the cover. The knob 88 is provided with a pointer 88'' cooperable with a suitable scale and indicia provided on the control cover 89 adjacent knob 88 and comprising the words "hot," "warm" and "medium," to indicate the temperature adjustment for which the mechanism is set.

From the foregoing it will be understood that the spring 82 is compressed to resist to a variable extent the closing of the mercury switch. If the water in the heater is cold the volatile liquid in the thermo unit will contract and this will result in the atmospheric pressure shifting the diaphragm of the bellows to the left as shown in Figure 1 against the action of the spring 82. This swings the lever 61 in a counter-clockwise direction as viewed in Figure 1 thereby moving the mercury switch to closed position and energizes the electromagnet 35 to cause the metering valve to be shifted to its high fire position. As the water heats up the volatile liquid in a thermo unit expands and together with spring 82 swings the lever 61 in a clockwise direction as viewed in Figure 1 so that when the water in the heater reaches the selected temperature the mercury switch is swung to its open position to de-energize the magnet 35 and allow the metering valve to drop to its low fire position.

In many instances it is desirable to combine a blower with the burner of the water heater. Where a blower is employed the present invention proposes to control its action automatically and to accomplish this by the thermo unit and mercury switch above described.

Figure 8:
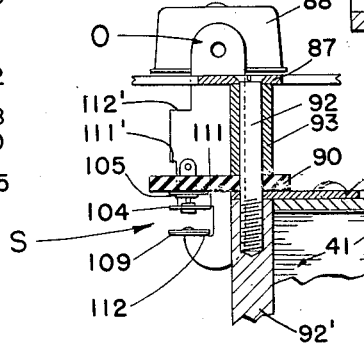
Figure 8 is another similar view taken on line 8—8 of Figure 5.

For the purpose of enabling the thermo unit and the mercury switch to control automatically the electromagnet 35 and the blower referred to, a terminal board or panel of insulating material designated at 90 is supported on and secured by screws 90' to the upper ends of posts 91 integral with the base 40' of the control frame and also on the mounting plate 37. A screw 92 (see Figures 2, 5 and 8) has its head countersunk in an opening provided therefor in the plate 87 and has its lower end threaded into a short post or boss 92' integral with the base 40', the screw extending through openings in the panel or terminal board 90 and in the portion of the plate 37 interposed between the panel 90 and the top of the post 92'. A spacing sleeve 93 is interposed between the plate 87 and the terminal board 90 to maintain the terminal board in proper position and supplement the support of the plate 87.

Figure 4:
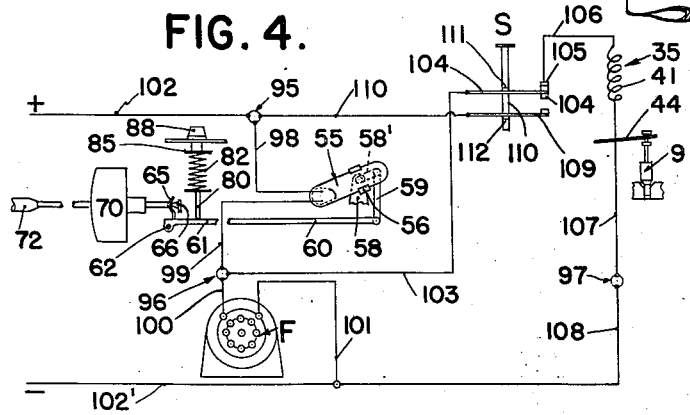
Figure 4 is a diagrammatic view of the electric circuits involved.

On the terminal board 90 binding posts 95, 96 and 97 are secured. The binding post 95 is connected to one side of the source of power preferably to the so-called "hot" wire 102 (see Figure 4). A short section of flexible insulated wire 98 leads from the binding post 95 to one of the electrodes of the mercury switch (see Figures 1, 4 and 5). A second short section of flexible insulated wire 99 connects the other electrode of the mercury switch 55 with the binding post 96. As shown in Figure 4, this binding post 96 is connected by a suitable conductor 100 to one terminal of the motor of the blower or fan F. The other terminal of this motor is connected by a wire 101 to the other side of the line designated at 102'. The binding post 96 is also connected by a conductor 103 with the intermediate blade contact 104 of a manually operable switch designated generally at S. This blade contact 104 is supported in an insulated manner on the underside of the terminal board and is biased by its inherent resiliency normally to engage a fixed contact 105 also supported on the terminal board and electrically connected by a flexible insulated conductor 106 to one terminal of the winding 41 of the electromagnet 35. The other terminal of this winding is connected by a wire or flexible insulated conductor 107 to the binding post 97 which, in turn, is electrically connected by a conductor 108 with the other side of the line designated at 102. The switch S also has a lower spring contact 109 supported on a bracket 110 which is electrically connected to the binding post 95 and biased by its inherent resiliency to be normally out of contact with the intermediate contact 104 and hence is normally electrically disconnected from both contacts 104 and 105. A switch operator O in the form of a strip of rigid insulating material is slidably mounted in a slot provided therefor in the plate 87 and panel 90 and has its intermediate portion provided with slots or notches in one edge so as to provide shoulders 111 and 112 engageable with the contacts 104 and 109, respectively. By lifting this switch operator the contact 109 may be brought into engagement with the contact 104. By depressing it the contact 104 may be disengaged from the contact 105 and brought into engagement with the contact 109. Shoulders or stops 111' and 112' on the operator O are respectively engageable with the panel 90 and plate 87 to limit the movement of the operator O in either direction.

In the ordinary operation of the control the service switch S is positioned as shown in Figure 4. If the bellows shifts the mercury switch 55 to the closed position as shown in Figure 4, current will flow from one side of the line through the binding post 95, conductor 98, to one electrode of the mercury switch. The mercury in the closed position of the switch bridges the electrodes so that the current continues to flow out through the other electrode and the wire 99 to the binding post 96. From the binding post 96 the current flows from the wire 100 to the motor of the blower F and thence through the wire 101 to the other side of the line. The current also flows from the binding post 96 through the connector 102 to the contact 104 of the service switch S, thence through contact 105, the wire 106 to the winding 41 of the electromagnet 35, and from this winding through wire 107, binding post 97 and wire 108, back to the other side of the line. As a consequence, the blower F is started and the electromagnet 35 being excited lifts the metering valve 9 to its high fire position. When the temperature of the water in the heater has risen to the selected value the bellows 70 shifts the mercury switch 55 to cause the body of mercury therein to shift to the end thereof away from the electrodes thereby breaking the circuit between the electrodes of the mercury switch. Consequently, the supply of current to the motor of the blower F and to the electromagnet 35 is shut off. The blower stops, the metering valve drops to its low fire position.

The service switch S allows the service man to place the control and burner in a "high fire" position without drawing off hot water from the tank and waiting for the thermo unit or mechanism to cause the high fire operation. To accomplish this the service man lifts the switch operator 111 which engages the contact 109 with the contact 104 so that it is electrically connected with the contact 104 and also with the contact 105. Hence, even though the mercury switch 55 be in its open position, when the service switch is so manipulated, the current will flow from the binding post 95 to the contact 109 of the service switch to which it is electrically connected by bracket 110 and then from contact 109 through contacts 104 and 105, to wire 106, winding 41, wire 107, binding post 97 and wire 108, back to the other side of the line. This raises the metering valve to its high fire position. At the same time the current flows from the contact 104, through wire 103, binding post 96, and wire 100 to the motor of the blower, and thence through wire 101 back to the other side of the line. This causes the blower to operate.

If the burner has become flooded while adjustments are being made the switch operator O is depressed to disengage contact 104 from contact 105 and engage it with contact 109. This prevents energization of the winding 41 of the electromagnet, but causes the blower motor to operate and to burn off the excess oil while keeping the oil metering valve in a low fire position, since at this time, the current flows from the binding post 95, through contact 109, contact 104, wire 103, binding post 96 and wire 100, to the blower motor, and thence through wire 101 back to the other side of the line.

With this construction, the high and low fire may be easily set by removing the cover 89 and suitably turning the knurled adjusting nuts 25 and 26 of the metering valve stem. The desired water temperature may be obtained by simply setting the heat control knob 88 to the point which gives the desired water temperature. It should be noted also that the control is what may be termed as a "fail safe" unit, that, if the capillary tubing or bellows should in any way become ruptured the control immediately goes to the low fire position.

Figure 3:
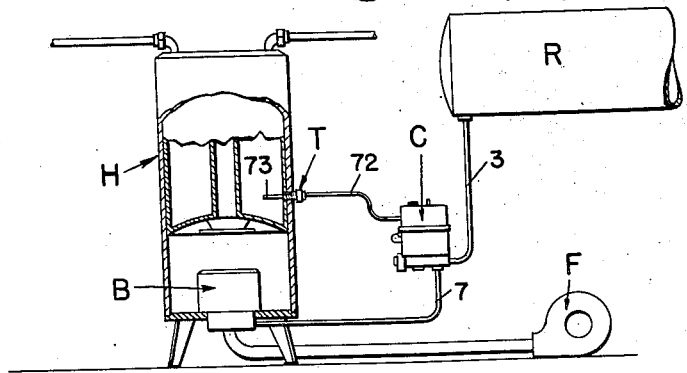
Figure 3 is a diagrammatic view partly in side elevation and partly in vertical section illustrating how the device is applied to a burner.

As shown in Figure 3 of the drawings, the control device embodying the present invention and designated generally at C is interposed between the fuel reservoir R and the water heater or other heater designated generally at H. The pipe line 3 leads from the reservoir R to the inlet of the control device C and a pipe line 7 leads from the outlet of this control device to the burner B of the heater. A thermo-responsive unit designated generally at T and equipped with the immersion well 73 and thermo bulb above described is located in the heater H and influenced by the temperature of the water therein. The blower F is combined in any suitable way with the burner and is controlled in its operation as above described.

While I have shown and described one construction in which the invention may be advantageously embodied, it is to be understood that this construction has been selected merely for the purpose of illustration or example and that various changes in the size, shape and arrangement of the parts may be made without departing from the spirit of the invention or the scope of the subjoined claims.

The invention claimed is:

1. A control device for an oil burner comprising an oil supply chamber provided with an outlet opening, a valve for regulating the flow of oil through said opening having a stem projecting above the top of said chamber and provided with an adjustable nut, a frame adapted to fit on said chamber, an electro-magnet having a split flux conveying rings, the lower portion of which constitutes an armature, said electromagnet carried by said frame at one side thereof with its core disposed vertically of said chamber, an arm extending from said armature and adapted to engage the under side of said nut, a spring yieldably urging said arm upwardly toward said armature, a thermostatically operated bellows secured to said frame adjacent one end thereof with its force-supplying rod disposed horizontally of said chamber, a lever fulcrumed to said frame near the bottom thereof and to the side thereof opposite said electro-magnet, said lever being operatively engaged by said rod, a mercury switch pivotally carried by said frame adjacent said lever, a link interconnecting said switch and said lever, an adjustable spring member carried by said frame and engageable with said lever, and an electric circuit connecting said electro-magnet to said switch.

2. A control device adapted to be associated with and forming part of a liquid level gravity feed oil burner control having a high and low metering valve, said device comprising a frame-like housing adapted to fit on and conform with the outlines of said liquid level control device, said frame having secured thereto an electro-magnet having a vertically swingable armature, said armature being adapted to engage with and raise said metering valve, a pivoted mercury switch controlled through linkage by a thermostatic bellows all positioned on said frame adjacent the aforesaid electro-magnet, a spring adjustment carried by said frame and operable from the top thereof to adjust the action of said bellows on said switch, a circuit connecting said electro-magnet and said switch, and a terminal plate carried by said frame whereby a source of electric power may be supplied to said circuit and whereby said switch may be available to control a motor in addition to its control of said electro-magnet.

ROY W. JOHNSON.